UNITED STATES PATENT OFFICE.

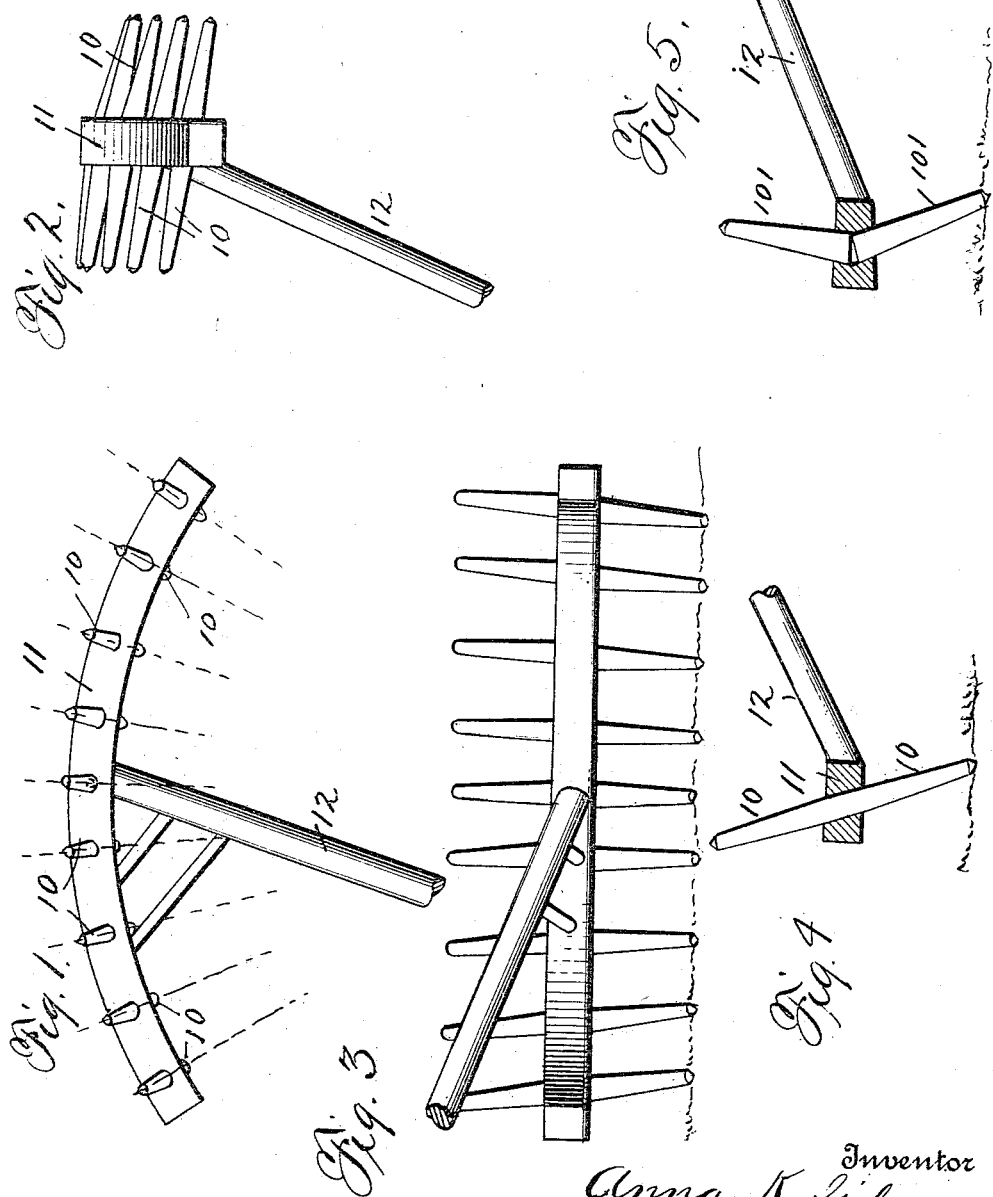

ANNA K. GILSON, OF QUECHEE, VERMONT.

HAND-RAKE.

1,267,654.     Specification of Letters Patent.     Patented May 28, 1918.

Application filed August 19, 1916. Serial No. 115,892.

*To all whom it may concern:*

Be it known that I, ANNA K. GILSON, a citizen of the United States, and resident of Quechee, in the county of Windsor, and in the State of Vermont, have invented a certain new and useful Improvement in Hand-Rakes, and do hereby declare that the following is a full, clear, and exact description thereof.

My invention relates to hand rakes, and my objects, generally stated, are to provide a construction which will combine the qualities of high efficiency in the performance of the raking operation and a minimum of labor and discomfort, and which will combine lightness and strength, and to these ends my invention consists in the rake having the construction substantially as hereinafter specified and claimed.

In the accompanying drawings—

Figure 1 is a top plan view of a rake embodying my invention;

Fig. 2 is a side elevation thereof;

Fig. 3 is a rear elevation of said rake;

Fig. 4 is a cross section on an enlarged scale of the rake passing through the rake head and parallel with the teeth;

Fig. 5 is a similar view showing a different embodiment of my invention.

I have embodied my invention in a rake of the double type, that is to say, there are two sets of teeth 10 projecting from opposite sides of the head 11. The rows of teeth and the head extend at an angle outwardly and rearwardly with reference to the handle 12, and preferably in the arc of a circle, and the handle extends at an angle to the chord of the arc so that the head with the rows of teeth forms an obtuse angle with the handle on one side, and an acute angle with the handle on the other side, and besides such obliquity of the handle with reference to the head it extends at an incline upward and rearward, considering the matter as with the rake head situated in a horizontal plane, or position. The double inclination of the handle is advantageous because it diminishes the necessity for bending in the use of the rake, and the grass, or hay may easily be drawn in a direction to one side of the position of the operator as he rakes, and it enables easy access of the rake into angles that are difficult to get into with the ordinary construction of rake handle. Simply by turning the rake over it may be used equally well on either the right hand, or the left hand.

The rake teeth also project from the head at an angle other than a right angle, and their inclination is such with reference to the handle and direction of pull in raking, that with the rake head itself in a horizontal plane, the rake teeth will extend downward and rearward no matter which row of teeth is being used, and thus the material being raked will be caught by inclined surfaces of the teeth which extend upward and forward from the tips of the teeth, and thus the slipping of the teeth over the material and the consequent escape of the latter prevented, and the operation of dislodging grass, or hay from furrows in the field greatly facilitated. Moreover, as the teeth-receiving holes in the rake head extend obliquely through the head, a thinner rake head from top to bottom can be employed without any diminution of the extent of surface contact between the portions of the rake teeth within the head openings and the sides of the latter, and thus a lighter structure can be provided without any sacrifice of strength. As best shown in Fig. 4, the rake teeth on opposite sides of the head have their longitudinal axes in alinement, and each double tooth consists of but a single element. As shown in Fig. 5, the rake teeth 101 on opposite sides of the head may be formed separately, and opposing teeth extend in diverging directions. Either wood or metal may be used in the construction of all, or any of the parts of my rake, although its characteristics are such that the employment of wood is particularly advantageous.

As is clearly shown in Fig. 1, the teeth are arranged on lines radial to the center of the arc of the head, so that with the inclination of the teeth the result is that points of the teeth on one side of the head are farther apart than the points of the teeth on the opposite side of the head, and thus two rakes with differently spaced teeth suitable for different kinds of material at different times, are provided.

Having thus described my invention what I claim is—

1. A rake comprising a head, a handle connected with the head, rows of teeth projecting from top and bottom of the head respectively, the teeth of both rows extending at an angle with the direction of the handle, and the angle of one row being different from the other row, and the teeth of the row on one side of the rake head converging and those on the opposite side diverging, whereby the distance between the points of the teeth is less on one side of the head than on the other.

2. A rake comprising a head, a handle connected with the head and extending at an incline upward and rearward from its point of connection with the head, a row of teeth projecting from top and bottom of the head, the teeth of one row extending rearward in the direction of the pull of the rake when such teeth are lowermost and in raking position and forming an acute angle with the direction of the handle, and the teeth of the other row extending in a direction that is inclined rearward with reference to a horizontal plane and the direction of pull of the rake, the teeth of the row on one side of the rake head converging and those on the opposite side diverging, whereby the distance between the points of the teeth is less on one side of the head than on the other.

In testimony that I claim the foregoing I have hereunto set my hand.

ANNA K. GILSON.

Copies of this patent may be obtained for five cents each, by addressing the "Commissioner of Patents, Washington, D. C."